(12) United States Patent
Falor et al.

(10) Patent No.: US 10,049,138 B1
(45) Date of Patent: Aug. 14, 2018

(54) REPUTATION AND ENGAGEMENT SYSTEM FOR ONLINE COMMUNITY MANAGEMENT

(71) Applicant: Google Inc., Mountain View, CA (US)

(72) Inventors: Ryan Andrew Falor, Boulder, CO (US); Richard Feit, Boulder, CO (US); Marcos Boyington, Boulder, CO (US); Mark Morgan, Longmont, CO (US); Brian Ziman, Erie, CO (US)

(73) Assignee: GOOGLE LLC, Mountain View, CA (US)

( * ) Notice: Subject to any disclaimer, the term of this patent is extended or adjusted under 35 U.S.C. 154(b) by 304 days.

(21) Appl. No.: 14/257,233

(22) Filed: Apr. 21, 2014

Related U.S. Application Data

(60) Provisional application No. 61/948,184, filed on Mar. 5, 2014.

(51) Int. Cl.
*G06F 17/30* (2006.01)
*G06F 11/34* (2006.01)
*G06F 21/31* (2013.01)

(52) U.S. Cl.
CPC .......... *G06F 17/3053* (2013.01); *G06F 11/34* (2013.01); *G06F 21/316* (2013.01)

(58) Field of Classification Search
CPC ......... G06F 17/30; G06Q 30/02; G06Q 30/00
See application file for complete search history.

(56) References Cited

U.S. PATENT DOCUMENTS

| | | | |
|---|---|---|---|
| 7,523,138 B2 | 4/2009 | Gruhl et al. | |
| 9,311,619 B2 * | 4/2016 | Mosley | G06F 17/30864 |
| 2007/0078675 A1 * | 4/2007 | Kaplan | G06Q 10/10 |
| | | | 705/26.1 |
| 2008/0109244 A1 | 5/2008 | Gupta | |
| 2008/0109491 A1 * | 5/2008 | Gupta | G06Q 10/10 |
| 2009/0106697 A1 * | 4/2009 | Ward | G06Q 10/06 |
| | | | 715/835 |

(Continued)

OTHER PUBLICATIONS

Thurrott, Paul, "Xbox One Preview: Reputation", WinSuperSite.com, Jun. 12, 2013.*

(Continued)

*Primary Examiner* — Pierre Vital
*Assistant Examiner* — Alicia Antoine
(74) *Attorney, Agent, or Firm* — Lowenstein Sandler LLP

(57) ABSTRACT

Methods, systems, and computer programs are presented for an online community management system. One method calculates users' reputations that are based on the activities of each user in the online community. The reputation measures the quality of the user activities in the community. Further, the method includes operations for periodically calculating reputation statistical measures based on the users' reputations, and for sorting the users based on the reputation statistical measures. A user interface for a manager of the online community is provided, the user interface including a presentation of reputation information about a group of users of the online community identifying trends in changes of the reputation. The group of users is selected based on the sorting, and the user interface provides an option to select a first user from the group of users to obtain a display of events associated with the selected user in the online community.

18 Claims, 10 Drawing Sheets

(56) References Cited

U.S. PATENT DOCUMENTS

| | | | |
|---|---|---|---|
| 2011/0307312 A1* | 12/2011 | Goeldi | G06Q 10/00 |
| | | | 705/14.6 |
| 2012/0290977 A1 | 11/2012 | Devecka | |
| 2013/0018972 A1* | 1/2013 | Sargent | G06Q 10/10 |
| | | | 709/206 |
| 2013/0073336 A1 | 3/2013 | Heath | |
| 2013/0145323 A1* | 6/2013 | Ward | G06F 3/0482 |
| | | | 715/835 |
| 2013/0246521 A1 | 9/2013 | Schacht et al. | |
| 2014/0135956 A1* | 5/2014 | Thurman | A63F 13/428 |
| | | | 700/91 |
| 2014/0181087 A1* | 6/2014 | Wu | G06F 17/30554 |
| | | | 707/722 |
| 2014/0181194 A1* | 6/2014 | Sullivan | G06Q 50/01 |
| | | | 709/204 |
| 2017/0225079 A1* | 8/2017 | Conti | A63F 13/75 |

OTHER PUBLICATIONS

WinHotel, "Reputation Analytics", https://www.youtube.com/watch?v=UllQqrHMzXE&feature=youtu.be, May 15, 2013.*

* cited by examiner

Reputation dashboard for email

[Actions ▼]

| Member Name | Reputation | Percentile | Trend 30 days | Trend 7 days |
|---|---|---|---|---|
| ☐ George Washington 🔍 | 7733 | 99 | 118 ▲ | 89 ▲ |
| ☐ Thomas Jefferson 🔍 | 6054 | 99 | 94 ▲ | 61 ▲ |
| ☐ Patrick Henry 🔍 | 5571 | 98 | 84 ▲ | 71 ▲ |
| ☐ Brutus Caesarus 🔍 | 1162 | 89 | 15 ▲ | 10 ▲ |
| ☐ Alexander Hamilton 🔍 | 1007 | 88 | 16 ▲ | 6.9 ▲ |
| ☐ William Jackson 🔍 | 613 | 75 | 11 ▲ | 13 ▲ |
| ☐ Abraham Baldwin 🔍 | 606 | 74 | 11 ▲ | 15 ▲ |
| ☐ Richard Bassett 🔍 | 527 | 70 | 4.4 ▲ | 3.3 ▲ |
| ☐ Gunning Bedford, Jr. 🔍 | 459 | 68 | 0.18 – | 0.34 – |
| ☐ John Blair 🔍 | 329 | 55 | -0.22 – | -0.96 – |
| ☐ Benjamin Franklin 🔍 | 314 | 55 | 0.44 – | 0.07 – |
| ☐ William Blount 🔍 | 311 | 55 | 2.3 ▲ | 4.6 ▲ |
| ☐ David Brearly 🔍 | 278 | 48 | 4.7 ▲ | 4.1 ▲ |
| ☐ Jacob Broom 🔍 | 220 | 46 | 4.2 ▲ | 4.2 ▲ |
| ☐ Pierce Butler 🔍 | 137 | 39 | 4.3 ▲ | 4.4 ▲ |
| ☐ Daniel Carroll 🔍 | 113 | 38 | 1.4 ▲ | 0.36 – |

Fig. 2A

REPUTATION AND ENGAGEMENT SYSTEM FOR ONLINE COMMUNITY MANAGEMENT

CLAIM OF PRIORITY

This application claims priority from U.S. Provisional Patent Application No. 61/948,184, filed Mar. 5, 2014, and entitled "REPUTATION AND ENGAGEMENT SYSTEM FOR ONLINE COMMUNITY MANAGEMENT." This provisional application is herein incorporated by reference.

BACKGROUND

The present embodiments relate to methods for providing a management system for online communities, and more particularly, methods, systems, and computer programs for providing a management dashboard for managing online communities with large populations.

Online communities can range in size from a few dozen people to thousands of active participants. For example, some communities are directed to general consumers (e.g., product users). In these communities, also referred to herein as forums, users post questions and other users answer. In many cases, managers monitor user activity to avoid abuse or spam.

For a community to remain active and healthy, active management by one or several motivated members is often required. Managing these communities using existing approaches can be a challenge, especially for online communities in the thousands or tens of thousands of members. Having easily available metrics for activity and user impact can be extremely valuable to a community manager. Reducing the time and effort required to keep a community healthy will help ensure more online community engagement and more content creation.

One of the challenges for community managers is how to properly determine users who are contributing good content and are generally good experts, versus people that participate in the forums randomly, or that do not contribute good content, or that produce abusive content. Often, managers want to differentiate between a high quality user and a low quality user. This way, the online communities can provide quality content to users that do searches and recognize users that continue to produce good content.

It is in this context that embodiments arise.

SUMMARY

Methods, devices, systems, and computer programs are presented for providing a management system for online communities. It should be appreciated that the present embodiments can be implemented in numerous ways, such as a method, an apparatus, a system, a device, or a computer program on a computer readable medium. Several embodiments are described below.

In one embodiment, a method is presented for providing a management system for online communities. The method includes an operation for calculating a reputation value for users of an online community, the reputation value being based on activities of each user related to the online community. The reputation value is associated with a quality of the activities of the user in the online community. In addition, the method includes operations for periodically calculating one or more reputation statistical measures based on the reputation values for the users of the online community, and for sorting the users of the online community based on at least one of the reputation statistical measures. A user interface is provided for the manager of the online community, the user interface including a presentation of reputation information about a group of users of the online community and identifying trends in changes of the reputation value. The group of users is selected based on the sorting, where the user interface provides an option to select a first user from the group of users and obtain a display of events associated with the selected user in the online community. In one embodiment, the operations of the method are executed by a processor.

In one embodiment, a method includes operations for calculating a reputation value for users of an online community, the reputation value being based on activities of each user related to the online community, and for periodically calculating one or more reputation statistical measures based on the reputation values for the users of the online community. In addition, the method includes operations for sorting the users of the online community based on at least one of the reputation statistical measures, and for providing a user interface for a manager of the online community. The user interface includes the presentation of reputation information about a group of users of the online community, where the group of users is selected based on the sorting. In one embodiment, the operations of the method are executed by a processor.

In one embodiment, the reputation value is associated with a quality of the activities of the user in the online community, wherein the reputation value is calculated based on a plurality of reputation category values, each reputation category value being associated with a quality of the activities of the user in a respective category within the online community.

Further, wherein the reputation statistical measures include one or more of top reputation users, or trend for reputation value changes during last 30 days, or trend for reputation value changes during last seven days, or trend for reputation value changes in last 24 hours, or trends for reputation category value changes.

In several embodiments, the sorting is one or more of sorting by reputation value, or sorting by largest improvement in reputation value within a predetermined time period, sorting by largest decrease in reputational value within the predetermined time period, or sorting by reputation category value, or sorting by largest increase or decrease in reputation category value, or sorting by amount of activities within the predetermined time period.

In some embodiments, wherein the reputation categories include one or more of ask a question, or report an issue, or browser, or email, or account access and safety, or reading and receiving messages, or composing and sending messages, or contacts, or operating system, or mobile operating system, or email program, or share and discuss with others, or smart phone. In another embodiment, the reputation categories are defined and managed by the community manager.

In some embodiments, the activities of the user include one or more of messages posted, or replies to messages posted, or number of posts within a time period, or emails sent.

In some embodiments, automated actions for management of the online community are identified based on the reputation statistical measures, and the automated actions are performed.

In some embodiments, one or more rules are evaluated for determining alerts for a manager of the online community, and alerts are sent to the manager when the evaluating identifies alerts for the manager.

In one embodiment, the user interface the user interface provides a first option to enable a selection of one or more users, the user interface providing a second option to perform one or more management actions on the selected one or more users.

In some implementations, the one or more management actions include one or more of sending email, or increasing level, or decreasing level, or promoting status, or banning, or unbanning, or changing delivery settings, or changing posting permissions, or award achievement, or removing from online community.

Further, the user interface includes a third option for listing a reputation breakdown of a user reputation value by reputation category, and a fourth option for presenting graphs associated with the reputation value of a user, the graphs including one or more of a line chart for the reputation value of a user over time, or a bar chart by reputation category.

Additionally, the user interface includes a fifth option for providing the activities associated with a change in the reputation value.

In another embodiment, a system includes one or more processors, a community activity manager, a reputation engine, a reputation analyst, and a manager dashboard. The community activity manager oversees activities of users associated with an online community. Further, the reputation engine is operable to calculate a reputation value for the users of the online community based on the activities of the users related to the online community. The reputation analyst periodically calculates one or more reputation statistical measures based on the reputation values for the users of the online community. The reputation analyst is operable to sort the users of the online community based on at least one of the reputation statistical measures. Additionally, the manager dashboard provides a user interface to a manager of the online community, the user interface including a presentation of reputation information about a group of users of the online community. The group of users is selected based on the sorting. In one embodiment, the community activity manager, the reputation engine, the reputation analyst, and the manager dashboard are executed by the one or more processors.

Some embodiments include a graph engine module for creating graphs for one or more reputation statistical measures or the reputation value, and/or an automated actions module for evaluating one or more rules defining application of the automated actions, the automated actions module being operable to perform automated actions.

In some embodiments, an alert manager is included for generating alerts relating to activity in the online community, or a user database for storing user profile information, or a community database for storing online community activities.

Some embodiments include a reputation database for storing the reputation value for the users of the online community, and a reputation summaries database for storing the reputation statistical measures.

In yet another embodiment, a non-transitory computer-readable storage medium storing a computer program is provided. The computer-readable storage medium includes program instructions for calculating a reputation value for users of an online community, the reputation value being based on activities of each user related to the online community. The storage medium further includes program instructions for periodically calculating one or more reputation statistical measures for the users of the online community, and program instructions for sorting the users of the online community based on at least one of the reputation statistical measures. Further, the storage medium includes program instructions for providing a user interface to a manager of the online community, the user interface including a presentation of reputation information about a group of users of the online community, and the group of users being selected based on the sorting.

Other aspects will become apparent from the following detailed description, taken in conjunction with the accompanying drawings.

BRIEF DESCRIPTION OF THE DRAWINGS

The embodiments may best be understood by reference to the following description taken in conjunction with the accompanying drawings.

FIG. 2A illustrates a dashboard interface showing users from the online community and associated reputation parameters, according to several embodiments.

DETAILED DESCRIPTION

Figure 1:
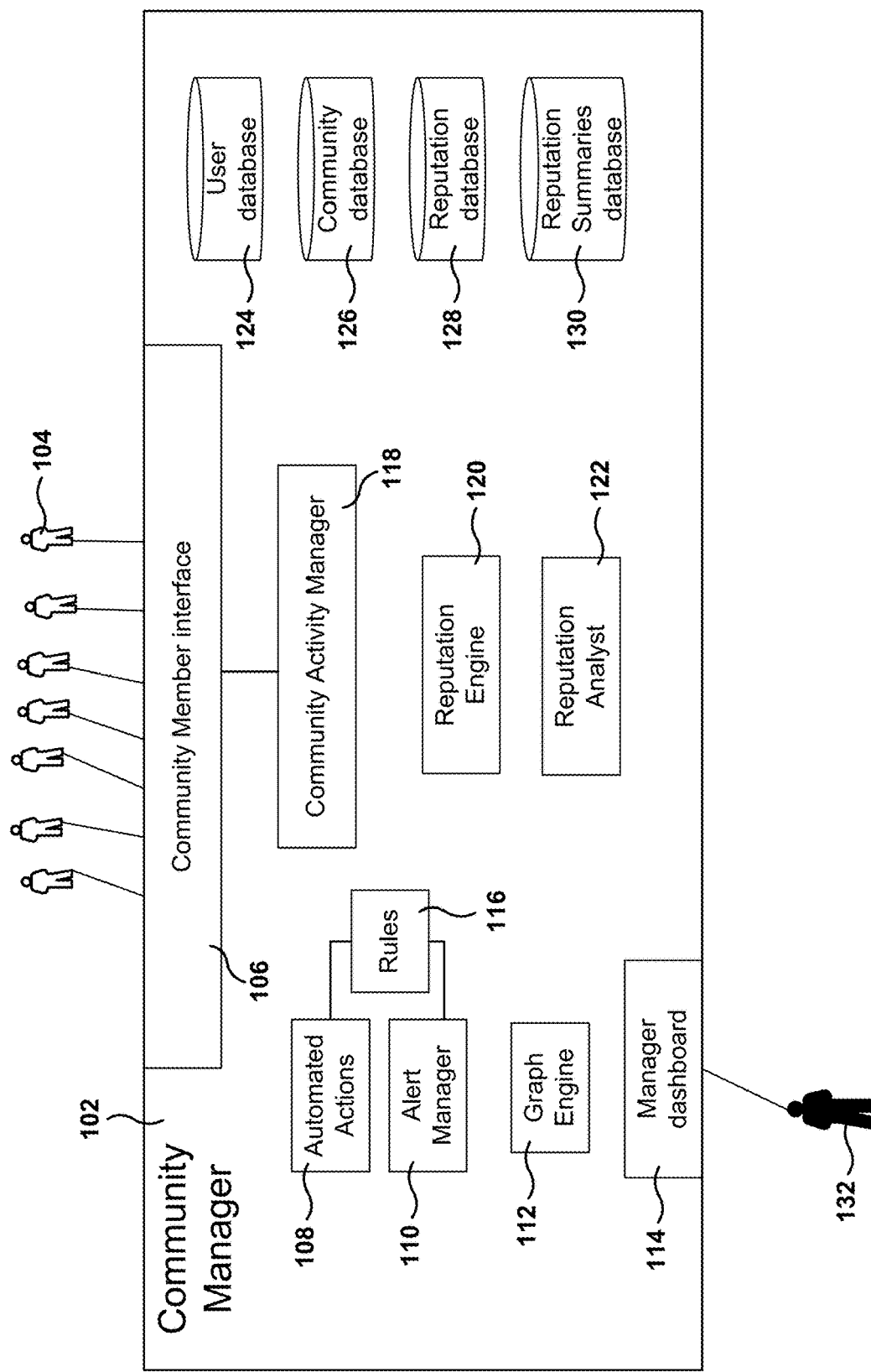
FIG. 1 illustrates a system for implementing embodiments presented herein, according to several embodiments.

The following embodiments describe methods, devices, systems, and computer programs for a management system for online communities. It will be apparent, that the present embodiments may be practiced without some or all of these specific details. In other instances, well known process operations have not been described in detail in order not to unnecessarily obscure the present embodiments.

In order to effectively manage an online community, managers need information about what is happening in the online community, such as who is participating actively, who is generating valuable content, which users are being abusive, which users should be nudged to participate more, etc. Some implementations accomplish this through manual processes or through the use of leaderboard and achievement systems. However, manual approaches do not work for online communities that can be in the hundreds of thousands of users.

To assist in the management of the online community, a reputation metric is used, also referred to herein as reputation, or reputation parameter, or reputation score, or reputation value. The reputation value defines the quality of the activities of the user in the online community. The better the activities of the user are for the community (i.e., high quality activities), the higher the reputation of the user. High quality activities are activities that further the interest of the community (e.g., answering questions from other users related to the topic of interest of the community).

In one embodiment, the reputation value is calculated based on a plurality of reputation category values, each reputation category value being associated with the quality of the activities of the user in a respective category within the online community.

In several embodiments, the reputation may be measured in different scales, such as 0 to 1, 0 to 1000, 1 to 10,000, 1 to infinity, −1 to 1, −10 to 10, −5000 to 5000, etc. Any reputation scale may be used for the embodiments described herein.

Further, reputation measures the credibility of a user in the community. The reputation of an individual is built over time depending on the individual's behavior in the community. Reputation built on previous acts of an individual helps people in the community to predict the quality of work of the individual. Further, reputation is used in some forums to give more visibility to posts of high-reputation users than to posts of low-reputation users. That is, reputation is used to sort posts and searches within the forum.

Some reputation systems record all the online contributions made by the user in the online community and provide a way for users to rate each other's contributions to the online community. For example, some forums are used for selling and buying goods. A reputation management system assigns a reputation score to a user so that a seller having higher reputation score is considered more credible compared to another seller with a low reputation score.

A reputation engine is the algorithm and process by which signals from the forum are measured, and those signals are aggregated into reputation scores for the individual users. There are several feedback loops to assess the value of posts. For example, if the user posts a comment and somebody endorses the post, then the reputation of the user is increased. Or if the user replies to somebody else's post, then this may also increase the reputation. If someone marks a post as the best answer, then the user gets some reputation points. On the other hand, if a user post something inappropriate (e.g., abusive, offensive or unauthorized marketing), the reputation of the user will be decreased.

There are two significant use cases related to the reputation system: valuable content and valuable users. Valuable content is content with a high reputation value, and this valuable content is presented towards the top when a list of topics or messages is ordered by relevance. Valuable users are users with a high reputation and their contributions will also be presented with prominence in the online community. Further, these valuable users may also be given additional privileges or responsibilities within the online community.

In one embodiment, the reputation system includes two components: content reputation and author reputation. The content reputation is calculated for a message and topic based on the message author, helpful votes, and other signals. The author reputation is calculated for an author as a function of the content the author has created (i.e., messages authored and topics where the author has participated). In general, as used herein the term "reputation" refers to the author reputation, unless otherwise specified.

Embodiments presented herein bring together sophisticated analytics with individualized user profiles to provide an overview of the forum that community managers can quickly understand and use to take action. The reputation management system, and the interface provided to community managers, is referred to herein as the reputation dashboard because it provides easy controls for managing reputation-related information.

FIG. 1 illustrates a system for implementing embodiments presented herein, according to several embodiments. Community manager 102 includes a plurality of modules for implementing and managing the online community. A community member interface 106 provides the user interface for users 104 of the online community to access the online community of perform activities related to the online community.

It is noted that any module within the community manager 102 may communicate with any other module, and interconnecting lines between the different modules have been omitted for clarity.

The community activity manager 118 manages the operations of the community, including adding or removing users, bulletin boards, search engines, etc. The community manager 118 stores user information in the user database 124, and community information in community database 126. The community information may include posts, announcements, websites, etc.

Reputation engine 120 manages the reputation system for the online community, including the calculation of the reputation for users and for messages within the community. The reputation engine 120 stores reputation information in reputation database 128.

Reputation analyst 122 analyzes reputation value and calculates reputation statistical measures, which are stored, in one embodiment, in reputation summaries database 130. The reputation statistical measures are values derived from the raw reputation data utilizing one or more statistical functions (e.g., history, average, medium, trends within a predetermined period, reputation change value trends for a predetermined period, etc.).

In one embodiment, the reputation statistical measures include one or more of top reputation users, or trends for reputation value changes in last 30 days, or trends for reputation value changes in the last seven days, or trends for reputation value changes in the last 24 hours, or trends for reputation category value changes.

In general, the goal is to represent the statistical values in a way to the community manager that is useful for performing community management operations. The reputation analyst 122 provides a plurality of options, implemented in a graphical user interface (GUI) referred to herein as manager dashboard 114. The dashboard provides options for presenting subsets of reputation-related information and for allowing the community manager 132 to perform management actions. The reputation analyst 122 cooperates with community activity manager 118 to implement community management actions.

In one embodiment, the reputation analyst performs a periodic process (e.g., daily process) to analyze all the reputation scores for all members of the community and calculate summaries, such as list of top reputation users, least of bottom reputation users, list of users with the highest reputation changes within a week, etc. The result of the analysis is also saved in the reputation summaries database 130.

The reputation analyst 122 also stores information regarding reputation for each user. For example, the user may be given access to the reputation value, the reputation value changes, and to the reasons for the reputation changes. In one embodiment, the community manager includes options provided in the manager dashboard 114 for generating automated options or to send alerts to a community manager when certain events are detected. The automated actions module 108 analyzes one or more rules 116 to determine if an automatic action is needed. Each rule includes a condition and an action, and if the condition is satisfied, then the action is performed. For example, a rule may define that a user that reaches a reputation score of 5000 will be automatically promoted to level 3. This means that when the user reaches the 5000 threshold, the system will automatically promote the user to level 3 without requiring management action.

Similarly, alert manager 110 analyzes rules 116 to determine conditions that require an alert to be sent to one or more individuals. For example, a rule may indicate that an alert is to be generated when a posts exceeds 10 negative reviews. The alert may be in the form of an email that is sent to one or more managers, or presented in a dashboard area for alerts. This way, when the manager receives the alert, the manager may decide to review the post and remove the post if it is offensive. Graph engine 112 provides functionality to create different types of graphs and charts for displaying reputation-related information in the dashboard 114 in graphical form.

The manager dashboard 114, also referred to as the dashboard, consolidates the information about user reputation into a single command interface for community managers, forum owners, and others, providing a one-stop place to maintain and moderate the community.

When a request is made in dashboard 114, the reputation analyst 122 reads the summary for the request to provide context, and then provides the data associated with the request. In one embodiment, the data is sorted according to criteria associated with the request. For example, a request for top performers will produce a sorted list of the top 25 users by reputation score.

It is noted, that the community member interface 106 is different from dashboard 114. Although some of the reputation values are provided in the community member interface 106, not all the options available in the dashboard 114 are provided to regular users 104.

Dashboard 114 combines reputation-related metrics to create an overview of community activity and present a single dashboard with overall stats and users ranked by reputation totals and trends. In addition, the dashboard provides options to drill down on the reasons why a reputation score, or reputation-related metric (e.g., reputation improvement within the last month), has taken place, showing the reasons why the value has changed (e.g., listing of posts authored by the user).

In addition, dashboard 114 allows community managers to take actions on an individual or on a group of users. Actions include changing their role, changing the status of users, or sending a customized message to one or more users. Further actions include awarding additional points, privileges, visual badges, and status markers. More details are provided below with reference to FIGS. 2A and 2B.

The consolidated views in the dashboard provide a unique and powerful solution to the traditional issues of community management. Without this dashboard, community managers have to do a great deal of manual effort to review user activities, and to understand who should be trusted with more responsibility and who should be punished for being abusive. Now this effort can be accomplished quickly and easily. Unlike traditional leaderboards, embodiments provide greater information depth and assist community managers in identifying abuse and bad actors in the community.

The modules presented in FIG. 1 may be implemented in hardware, software, firmware, or any combination thereof. It is noted that the embodiments illustrated in FIG. 1 are exemplary. Other embodiments may utilize different modules, or combine the functionality of several modules into one, or distributive functionality of one module across a plurality of servers, or combine two or more databases into one, etc. The embodiments illustrated in FIG. 1 should therefore not be interpreted to be exclusive or limiting, but rather exemplary or illustrative.

FIG. 2A illustrates a dashboard interface showing users from the online community and associated reputation parameters, according to several embodiments. Community managers need to monitor the forums and take action to promote or demote users. In some cases, this means promoting users who are doing well and contributing to the forum. In other cases, this means investigating users who may be abusing the group. Managers need to have high visibility across a potentially very large group of users and need to be able to dig down into the details quickly to make informed decisions.

The dashboard provides a plurality of interfaces for showing consolidated reputation data to the manager. In the exemplary embodiment of FIG. 2A, the dashboard presents a list of users, in tabular form, with the most activity in the forum within the last 30 days.

The table provides a list of users, and for each user, the reputation score, a percentile according to reputation, the trend for the last 30 days, and the trend for the last seven days. The trend for the last 30 days is the difference in scores between the current reputation value and the reputation value that the user had 30 days earlier. In one embodiment, a graphical icon is provided next to the trend score to graphically represent that the reputation has increased or decreased (e.g., up arrow, down arrow, + sign, − sign, = sign, etc.)

This tabular representation provides community managers with quick access to see who the top performers are, and to other parameters, such as which are the new users that should be rewarded, or which are the users that have been drifting away (e.g., low participation in the forum).

The interface allows the manager to drill down to obtain details about a particular user, e.g., by clicking on the user's name or in a magnifying glass icon next to the user name. The manager can also take action to grant new user permissions, bonuses, or send a short note, as illustrated below in FIG. 2B.

By providing valuable information to community managers, managers can prevent negative conduct in the forum, as well as promote and encourage good participants. The lengthy and manual processes often used to manage these communities are avoided by presenting summary data consolidated into a single screen or into a few screens.

In one embodiment, the reputation analyst of FIG. 1 calculates the deltas of the change in reputation for each user. How much did the reputation of one user go up or down in the last week, or month, etc.? In addition, the reputation analyst may identify trends. The trends let the administrator know which users have been most active over a range of time. For example, there are new people in the forum that do not have a high score because they are new, but they have been very active and their reputation is quickly improving. The administrator can encourage them and tell them that they are doing a great job so they become long-term contributors.

In one embodiment, the dashboard provides different options for presenting summary data, including:

Users with high reputation,

Users who are trending up in reputation based on recent activity (with levers to adjust the timeline), Users with low or negative reputation scores (potential abusers), Aggregated statistics about the forum (e.g., total posting activity), Breakdown of recent changes in reputation for a user (activity, posts, metric), Graph of score changes, Take action on a user or group of users (e.g., change role, ban, send a message), Recent changes in reputation score for a user, Causes of recent changes in reputation for a user, and Comparisons between users in a given forum.

Figure 2B:
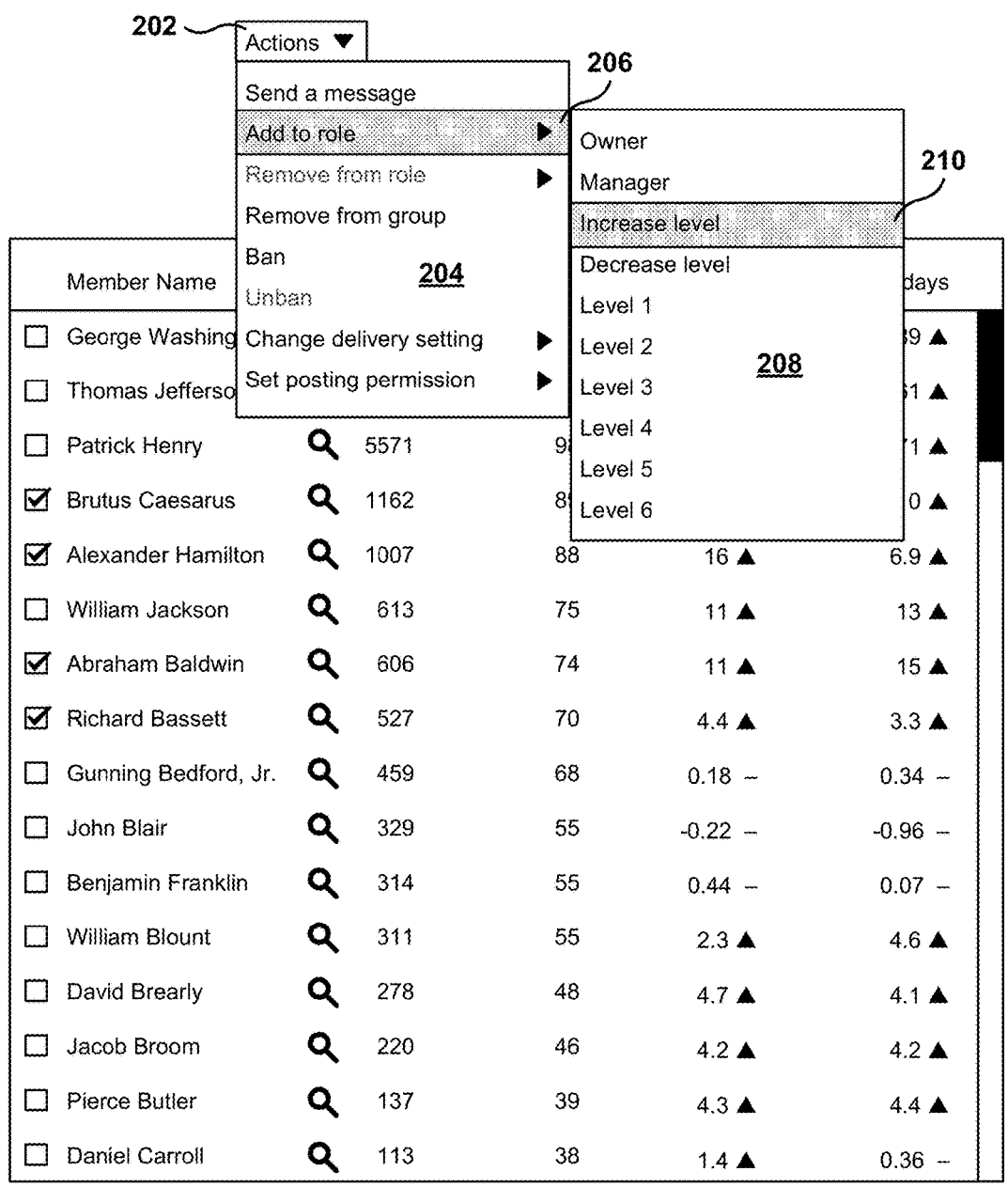
FIG. 2B illustrates an interface for a management system for online communities, according to several embodiments.

FIG. 2B illustrates an interface for providing a management system for online communities, according to several embodiments. The community manager does not have to find individual posts and study the results to identify the quality of the posters. For example, how long ago did a post happen, how often does a user post, etc. All that information is rolled up in the reputation dashboard.

The reputation dashboard allows the manager to easily and quickly perform actions on one or more users at the same time. In the embodiment of FIG. 2B, a check box is provided next to each user's name. If the manager selects one or more users, the manager may select one of the actions in pop-up menu 202.

After the user selects the actions menu 202, a list of options 204 is provided and the user is able to select any of the options. Some of the options may have submenus, such as option 206 for adding a new role to the user or users. The submenu 208 provides additional options, such as change the status to owner, manager, level 1, level 2, increased level, decrease level, etc. In one embodiment, the selected choice is highlighted by being presented with a different graphical representation (e.g., shaded in a different background, see actions 206 and 210).

In one embodiment, the actions available in the menu 202 include sending a message to the selected users, adding or changing the role of the users, removing the users from a certain role, removing the users from the group or community, banning the users, unbanning the users, changing the delivery settings for messages to the users, and set or changed permissions for posting in the community.

In other embodiments, the dashboard provides other options to the manager, such as identify which people are very active in the forum and show what they have been doing, change the user status to moderator, identify bad actors (people that have been active in the forum but in a negative way), etc.

In another interface (not shown), the manager is provided with automated options to be performed on certain users, without requiring the dashboard to list the users. For example, the interface may allow the manager to select the top 5 people on the dashboard and send them a congratulations email, select the top five people and add them to a role with increased responsibility, select the bottom five people and put them on probation, etc.

In one embodiment, automated actions are provided that do not require manager approval, as discussed above. For example, an auto assignment function will auto assign a user to a certain role (e.g., moderator) after the user reaches a threshold reputation score.

Figure 3:
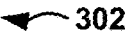
FIG. 3 is an interface illustrating the profile of the user and the reputation breakdown by category, according to one embodiment.

FIG. 3 is an interface illustrating the profile of the user and the reputation breakdown by category, according to one embodiment. The dashboard provides summarized user information. The option to display user information may be triggered by selecting an option in one of the interfaces described herein, or directly by selecting the name of the user from anywhere in the online community (e.g., in a post).

In the exemplary embodiment of FIG. 3, user profile information is presented together with some options for additional information. The profile information includes username, user photo if available, member status, reputation score, reputation trends within the last month or the last seven days, etc. In one embodiment, an option is provided to change the role of the user.

In one embodiment, additional options 302 provide detailed information about activities of the user, and the additional options 302 include reputation background, graphs, and activity report.

FIG. 3 shows the reputation breakdown for the user. Table 304 displays the reputation breakdown, where the columns include reputation category, reputation score, trend within the last 30 days, and trend within the last seven days.

In one embodiment, the reputation includes a total score (simply referred to as reputation or global reputation) and the reputation is form based on partial reputation scores for a plurality of reputation categories, also referred to as content areas or axis.

The categories breakdown the reputation into multiple activity areas, where each area contributes to the total reputation score of the user, although not all the areas may carry the same weight. Some users may be very active in some categories and not so active in other categories. By providing information about categories, the manager may encourage the user to continue the good behavior in one category, and also to encourage the user to participate in other categories with low activity where the contributions of the user would be valuable. For example, a user may have a high reputation for answering questions about a particular subject (e.g., fighting spam), but may have a low reputation scores in other areas (e.g., posting replies).

In one embodiment, the reputation categories include one or more of ask a question, report an issue, browser, email, account access and safety, reading and receiving messages, composing and sending messages, contacts, operating system, mobile operating system, email program, share and discuss with others, or smart phone. In another embodiment, the reputation categories are defined and managed by the community manager.

In other embodiments, other categories include: number of replies within a time period, number of votes for a helpful reply, number of views, number of times a post has been marked as "best answer," number of times a post has been marked as a favorite, number of times a post has been marked as spam, number of not-helpful votes, number of users subscribed to updates in a user thread, or number of times a topic has been marked as spam correctly (correctness is established by comparing signals to equivalent signals from other users who are known to be correct, or by a large number of voters).

The table may be sorted by any column, such as by category, by reputation, but biggest increase in the last 30 days, etc. In addition, the table may be customized to add or delete columns.

Figure 4:
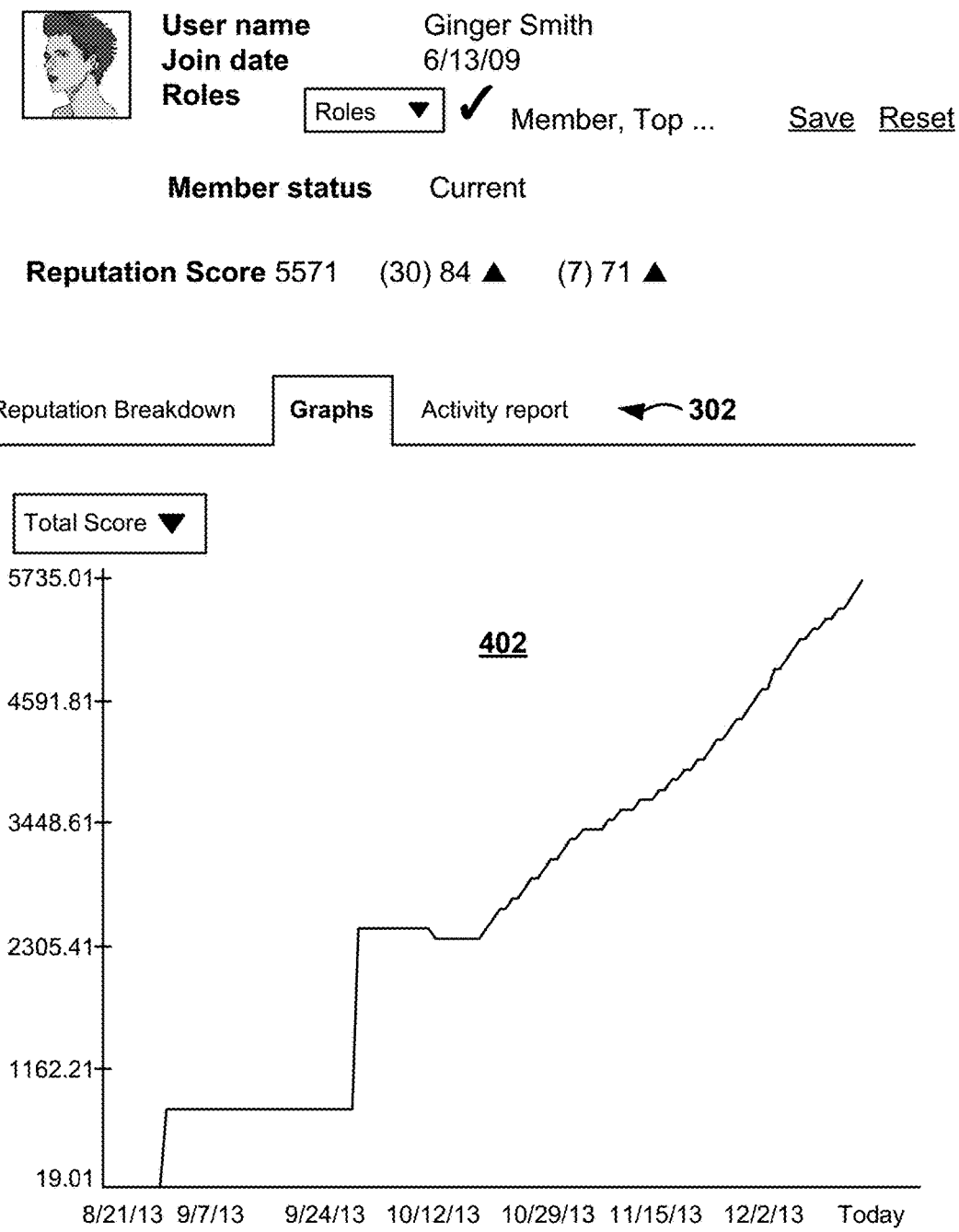
FIG. 4 illustrates an interface showing a graphical representation of the reputation value of a user over time, according to one embodiment.

FIG. 4 illustrates an interface showing a graphical representation of the reputation value of a user over time, according to one embodiment. The graphs option allows the manager to select from one or more different types of charts relating to user reputation. Chart 402 shows the change of the reputation value of a user over a time period.

In one embodiment, an option is provided for selecting the time period for the chart. A default time duration is provided initially (e.g., one month), which may be changed under manager preferences.

In another embodiment, the chart may be applied to a reputation category, instead to the global reputation. For example, a chart may be displayed showing how the user has performed historically for the category of "fighting spam."

It is noted that the embodiments illustrated in FIG. 4 are exemplary. Other embodiments may utilize different charts, different time periods, different axis, etc. The embodiments illustrated in FIG. 4 should therefore not be interpreted to be exclusive or limiting, but rather exemplary or illustrative.

Figure 5:
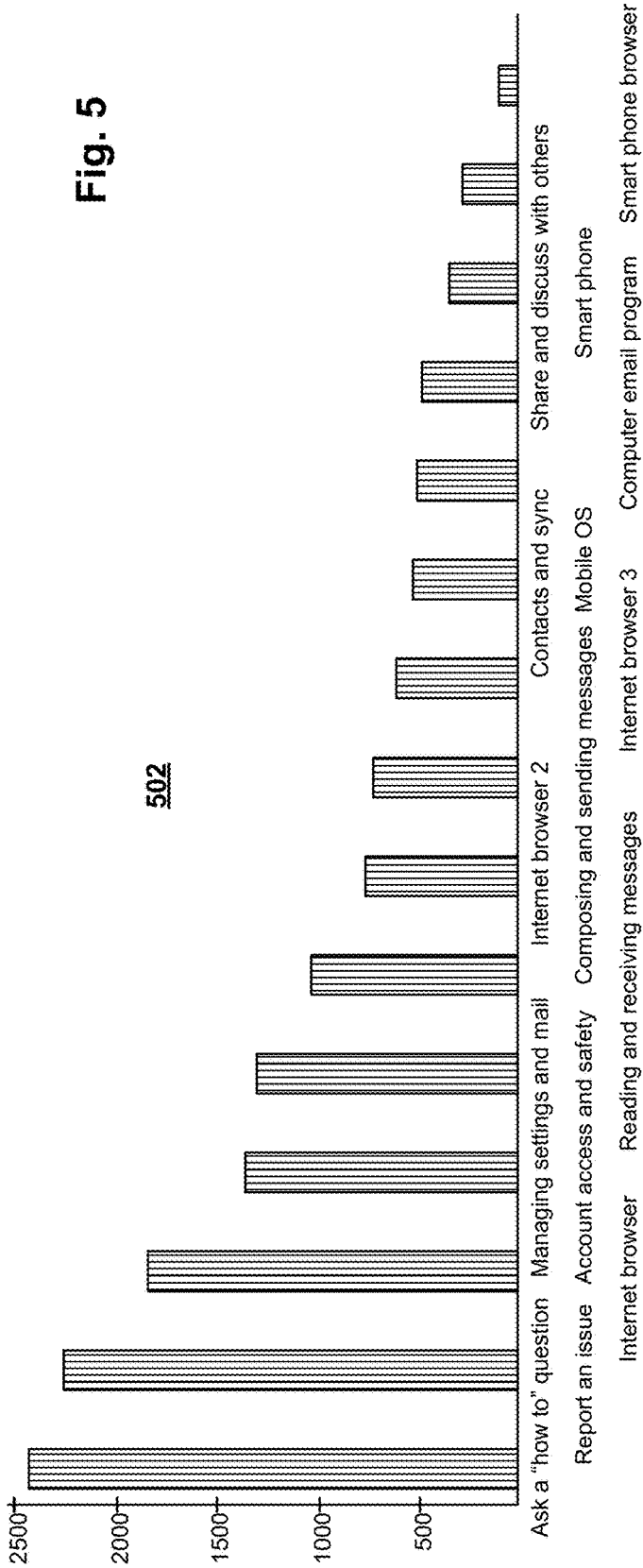
FIG. 5 is a graph chart showing reputation values by category, according to one embodiment.

FIG. 5 is a graph chart showing reputation values by category, according to one embodiment. FIG. 5 illustrates another type of chart 502. The chart is a bar chart by category, which illustrates how well the user is performing in different categories.

In one embodiment, only a subset of categories is displayed, especially if the number of categories in the community is large (e.g., 20 or more). In one embodiment, the manager may select to display the categories with the highest reputation value, or the categories with the lowest reputation values.

A similar chart may also be provided to the manager for the online community as a whole, but using activity levels for the different categories. This way, the manager may see the categories where users are very active, and the categories were activity is low. Further, the manager sees what are the topics of interest in the board and may look for additional information or activities related to the interesting topics.

Figure 6:
FIG. 6 illustrates an option for showing details on online community activities of a user, according to one embodiment.

FIG. 6 illustrates an option for showing details on online community activities of a user, according to one embodiment. In the different summary views, the option is provided to drill down on the activities or events that cause a certain parameter change (e.g., reputation score, reputation improvement, etc.). For example, the system is linked to a search function that allows the manager to see user posts.

FIG. 6 sows the dashboard after the manager has selected 602 the option to obtain details about a certain activity of the user (in this case, the second line within the table). This table provides a list of user activity sorted by time, and how each activity or event has contributed to the reputation value, including the reputation value delta for that event. The dashboard includes a presentation of post 604 entered by the user. In this case, the dashboard shows a reply entered to a question from another user.

In one embodiment, the system records every event which has contributed to the reputation of a user, including the actor and the other contributors to that entity's reputation.

In one embodiment, the reputation of a user is a function of the reputation of other users, and activities by other users may affect the reputation of the user. When the reputation is related to another entity, all contributing users will in turn be tacked or linked to that other entity. This enables the system to show an overview (or details) on how users have contributed to another user's reputation, allowing for degaming algorithms to find possible networks of users who are inflating each other's scores.

Figure 7:
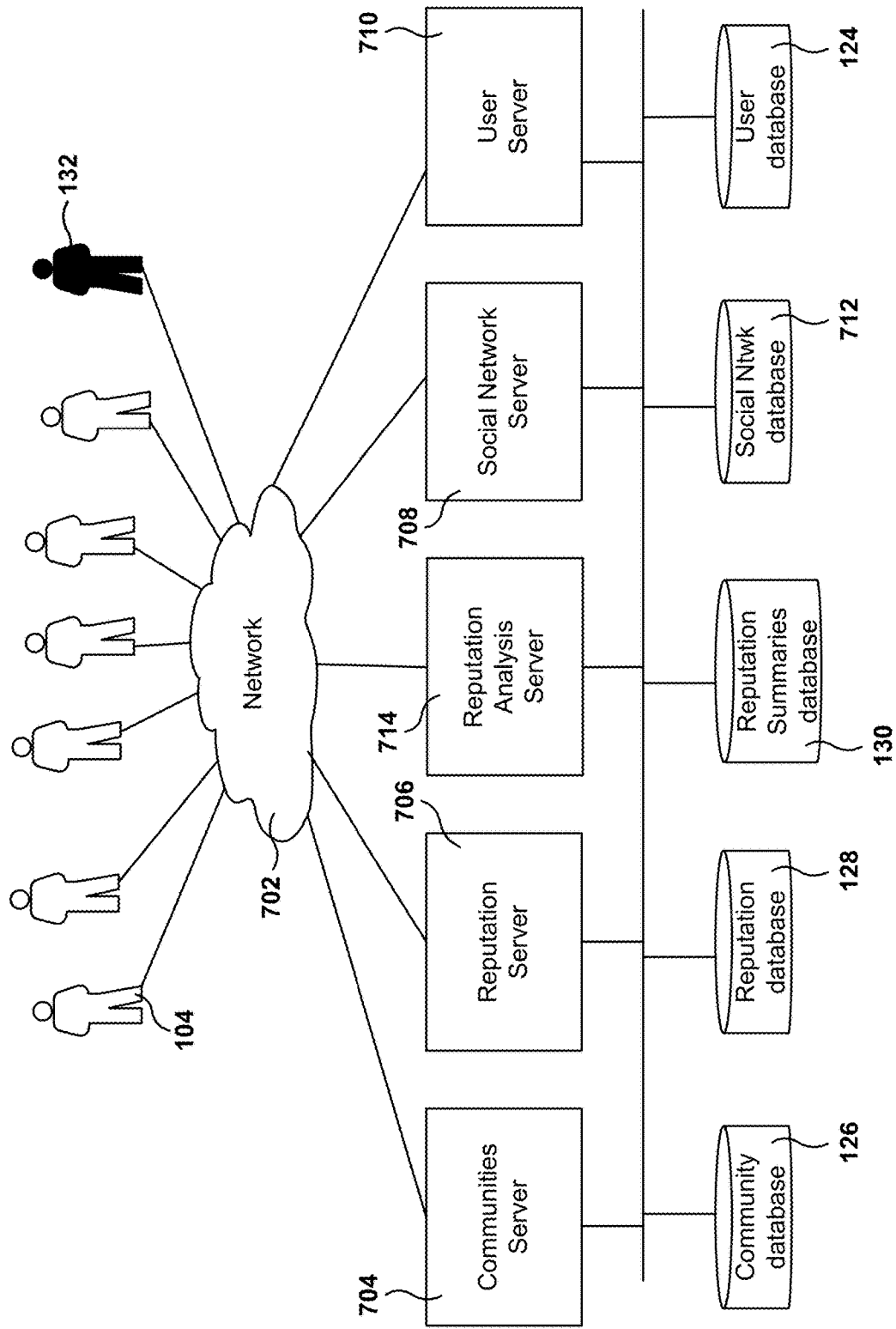
FIG. 7 is a system for deploying several implementations described herein.

FIG. 7 is a system for deploying several implementations described herein. A plurality of users 104 access a plurality of web services through network 702. In addition, a community manager 132 accesses the community servers to manage one or more online communities.

In several implementations, the web services include a social network, an email service, a search service, a forum service, a forum dashboard service, and others not shown, e.g., video or photo sharing, news service, online shopping service, etc.

The forum service is hosted by communities server 704; the reputation service is hosted by reputation server 706; and the forum dashboard service is hosted by reputation analysis server 714, which interacts with reputation server 706 to provide dashboard management functions. In addition, the social network service is hosted by social network server 708, and the user service is hosted by user server 710. These servers may be distributed over a plurality of distributed servers, or the functionality of several servers may be combined into a single server.

The user server 710 provides functionality for managing a plurality of users for one or more of the services described herein, wherein the management includes adding users, the leading users, keeping profile information about the user, etc.

The different servers are coupled to databases holding service-related information. The community database 126 host community data, the reputation database 128 includes reputation information, and the reputation summaries database 130 holds reputation summaries. Further, the social network database 812 includes social network related information (e.g., posts created in the social network, user profile information, etc.), and the user database 124 holds user profile information.

Further, the reputation analysis server 714 manages automated events that are triggered based on user reputation values. For example, a user may get a notification saying that the reputation level has been increased, which may mean additional permissions or status because the user has been doing well over a period of time. In addition, users may get special notifications, such as "you got 10 votes on your post".

In addition, reputation server 706 and/or reputation analysis server 714 will execute manual actions entered by the administrator through the dashboard. For example, "this person is doing well so I'm sending her a congratulatory email." The reputation analysis server 714 may also send alerts to one or more community managers, such as "there are 10 people in your forum that have reached a new negative threshold; consider taking action." In addition, the reputation server 700 and reputation analysis server 714 may provide regular summaries of activities or reputation-related events, such as daily reports sent via email.

The communities server 704 manages individual events happening in the forum, such as user posts, user replies to a post, user marking something as abusive, user voting up a particular topic, etc. For each user, the reputation server writes the list of events that contributed to the reputation of the user in reputation database 128. This way, the user record not only has the scores of the user, but also this list of events that contributed to the reputation scores.

For each event, a record is made into the database on how much the event affected, either positively or negatively, to the reputation score. The community manager may wonder why a user has been doing so well, and can look at the activity and see that it is because they have been posting a lot of replies to other people's posts, or that the user has been getting many best-answer votes. It gives the community manager the reasons why the reputation score of this person has gone up.

In one embodiment, the reputation database includes entries with the user's id and their reputation scores, and along with each reputation score and each category, the reputation delta is recorded.

The databases in FIG. 7 enable searching and sorting for all the values of parameters described herein, such as reputation delta is, reputation scores, events the change in reputation, etc. For example, the administrator is able to sort by reputation delta, such as who had the biggest increase in the last month.

Healthier communities are more active and produce more content. Embodiments presented herein facilitate better management of online communities, and make it easier to identify up-and-coming new users in the forum, allowing the administrator to incentivize them to be further engaged. Giving community managers these tools means that community managers have the information needed for managing the community and don't have to do lengthy manual processes.

In some embodiments, the reputation data from a plurality of communities is correlated, which means that activities of a user in one online community may affect the reputation score for the user in another online community. Further, in one embodiment a global reputation score is calculated for users, where the global reputation score accounts for the activity of a user in a plurality of online communities or online services.

Correlating reputation data among communities is important because the correlation may help identify good actors and back actors quickly. After all, a person that behaves well in one online community will likely behave well also in another community, and bad actors in one community will likely be bad actors in other communities (e.g., spam producers).

Further, if the user has a high reputation score in a first community but the user is new to a second community, the manager of the second community may boost up the initial reputation score so the user does not start from zero and is encouraged to participate in the second community.

It is noted that the embodiments illustrated in FIG. 7 are exemplary. Other embodiments may utilize different modules, combine the functionality of two modules into one, combine databases into a single database, distribute the functionality of a server among a plurality of distributed servers, etc. The embodiments illustrated in FIG. 7 should therefore not be interpreted to be exclusive or limiting, but rather exemplary or illustrative.

Figure 8:
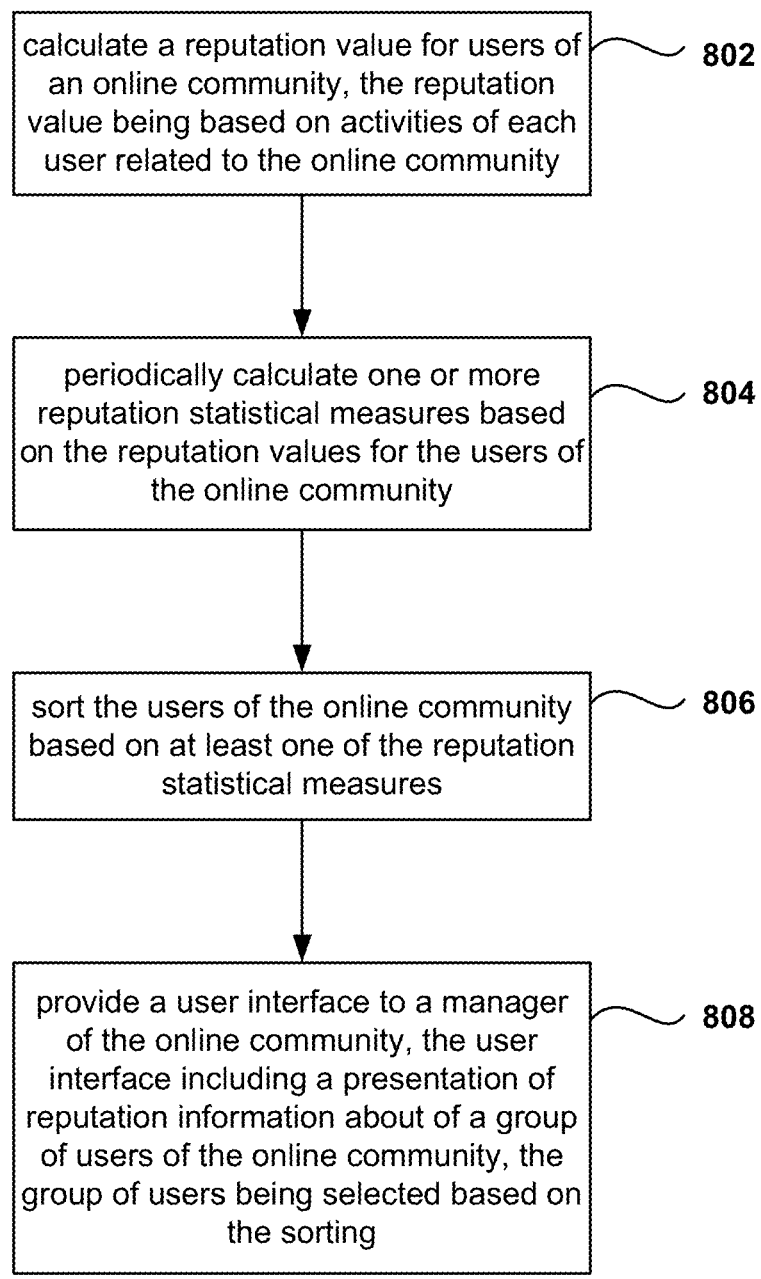
FIG. 8 is a flowchart for implementing a reputation management system for an online community, according to several implementations.

FIG. 8 is a flowchart for implementing a reputation management system for an online community, according to several implementations. While the various operations in this flowchart are presented and described sequentially, one of ordinary skill will appreciate that some or all of the operations may be executed in a different order, be combined or omitted, or be executed in parallel.

In operation 802, the reputation value is calculated for users of an online community. The reputation value is based on activities of each user related to the online community. From operation 802 the method flows to operation 804, for periodically calculating one or more reputation statistical measures based on the reputation values for the users of the online community.

In addition, from operation 804 the method flows to operation 806, where the users of the online community are sorted based on at least one of the reputation statistical measures. From operation 806 the method flows to operation 808, where the user interface is provided to a manager of the online community, the user interface including a presentation of reputation information about a group of users of the online community. The group of users is selected based on the sorting. In one embodiment, the operations of the method are executed by a processor.

Figure 9A:
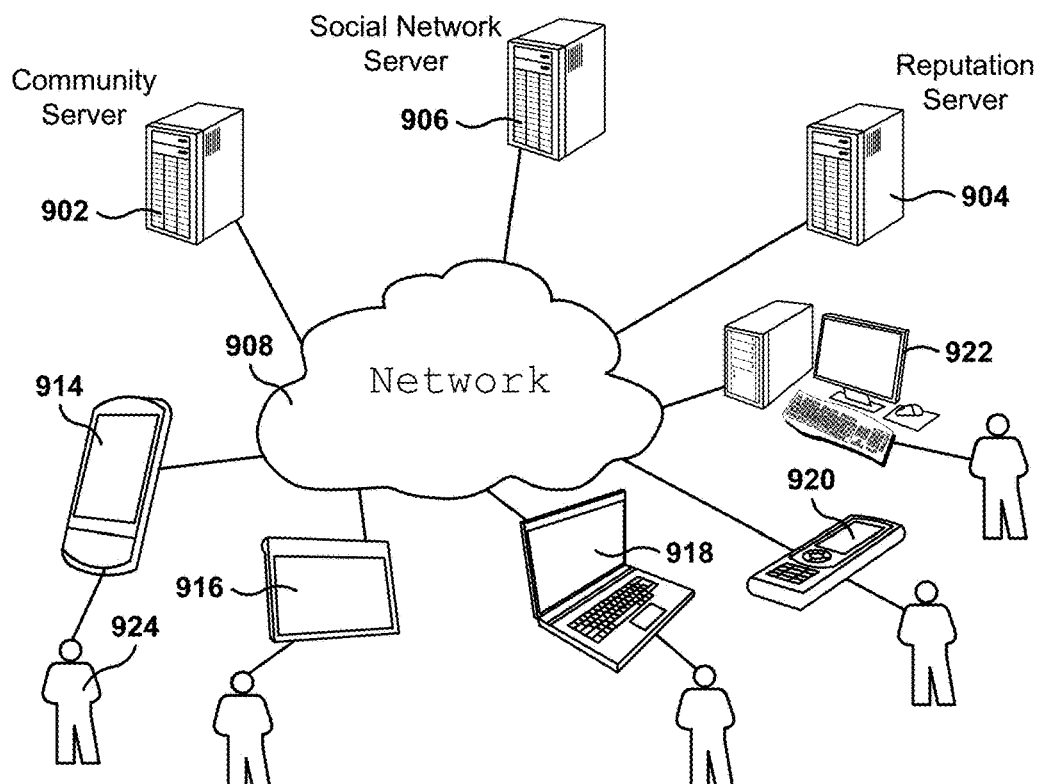
FIG. 9A provides one example architecture of a system that may utilize several implementations described herein.

FIG. 9A provides one example architecture of a system that may utilize several implementations described herein. Users 924 interact with each other in the context of a social network. In addition, each account includes a profile of the user with additional information about the user, e.g., birth date, gender, residence, favorite activities, etc. The user controls what information is added to the profile, and what information is shared with others. A user may access the social network through different devices, including a smart phone 914, a tablet computer 916, a laptop 918, a mobile phone 920, a personal computer 922, or any computing device that provides access to the Network 908. Of course, the illustrated devices are only examples.

In several implementations, social network server 906 delivers services that enable users to interface with each other. The social network provides a site that enables users to define user accounts, which can be people accounts and entity accounts. Through those accounts, users are able to connect with their friends, group of friends, entities, groups of entities, etc. In several implementations, the relationships established in the social network may be utilized in other contexts. Community server 902 manages and facilitates the services for one or more online communities. Reputation server 904 provides reputation management functions.

Other implementations may utilize different servers, have the functionality of one server distributed over a plurality of servers, have the functionality of two or more servers combined into a single server, have a different amount of user categories in the social network, categorize users by different criteria, etc. The implementations illustrated in FIG. 9A should therefore not be interpreted to be exclusive or limiting.

Figure 9B:
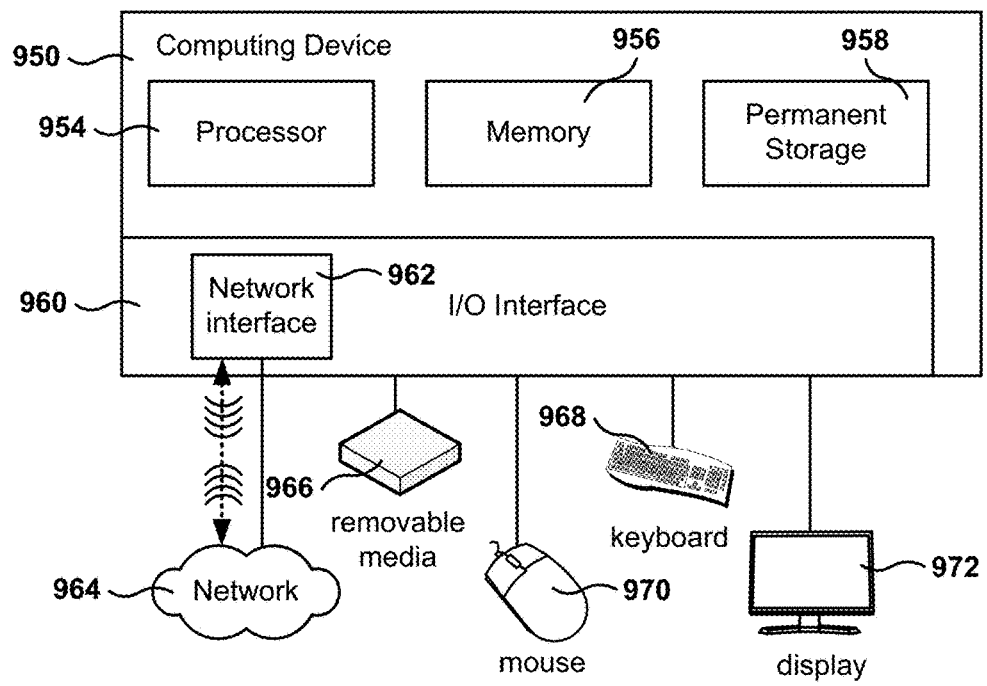
FIG. 9B is a simplified schematic diagram of a computer system for executing implementations described herein.

FIG. 9B is a simplified schematic diagram of a computer system for executing implementations described herein. It should be appreciated that the methods described herein may be performed with a digital processing system (e.g., a conventional, general-purpose computer system). Special purpose computers, which are designed or programmed to perform only one function, may be used in the alternative. The computing device 950 includes a processor 954, which is coupled through a bus to memory 956, permanent storage 958, and Input/Output (I/O) interface 960.

Permanent storage 958 represents a persistent data storage device like a hard drive or a USB drive, which may be local or remote. Network interface 962 provides connections via network 964, allowing messaging (wired or wireless) with other devices. It should be appreciated that processor 954 may be embodied in a general-purpose processor, a special purpose processor, or a specially programmed logic device. Input/Output (I/O) interface 960 provides messaging with different peripherals and is connected with processor 954, memory 956, and permanent storage 958, through the bus. Sample peripherals include display 972, keyboard 968, mouse 970, removable media device 966, etc.

Display 972 is defined to display the user interfaces described herein. Keyboard 968, mouse 970, removable media device 966, and other peripherals are coupled to I/O interface 960 in order to exchange information with processor 954. It should be appreciated that data to and from external devices may be transferred through I/O interface 960. Several implementations can also be practiced in distributed computing environments where tasks are performed by remote processing devices that are linked through a wired or a wireless network.

Implementations can be fabricated as computer readable code on a non-transitory computer readable storage medium. The non-transitory computer readable storage medium holds data which can be read by a computer system. Examples of the non-transitory computer readable storage medium include permanent storage 958, network attached storage (NAS), read-only memory or random-access memory in memory module 956, Compact Discs (CD), Blu-Ray™ discs, flash drives, hard drives, magnetic tapes, and other data storage devices. The non-transitory computer readable storage medium may be distributed over a network-coupled computer system so that the computer readable code is stored and executed in a distributed fashion.

Some, or all operations of the method presented herein are executed through a processor (e.g., processor 954). Additionally, although the method operations were described in a specific order, it should be understood that some operations may be performed in a different order, when the order of the operations do not affect the expected results. In addition, other operations may be included in the methods presented, and the operations may be performed by different entities in a distributed fashion, as long as the processing of the operations is performed in the desired way.

In addition, at least one operation of some methods performs physical manipulation of physical quantities, and some of the operations described herein are useful machine operations. Several implementations presented herein recite a device or apparatus. The apparatus may be specially constructed for the required purpose or may be a general purpose computer. The apparatus includes a processor capable of executing the program instructions of the computer programs presented herein.

Although the foregoing implementations have been described with a certain level of detail for purposes of clarity, it is noted that certain changes and modifications can be practiced within the scope of the appended claims. Accordingly, the provided implementations are to be considered illustrative and not restrictive, not limited by the details presented herein, and may be modified within the scope and equivalents of the appended claims.

What is claimed is:

1. A method comprising:
    calculating, by a processing device, a reputation value for a plurality of users of an online community, the reputation value being based on activities of each user related to the online community;
    periodically calculating, by the processing device, one or more reputation statistical measures based on changes in the reputation values for the plurality of users of the online community, a reputation statistical measure identifying a trend in changes of a corresponding reputation value over a period of time;
    determining, by an automated rule-based action module executed by the processing device, at least one automated action to be performed for at least one user of the plurality of users of the online community based on the one or more reputation statistical measures and a plurality of rules;
    performing, by the processing device, the at least one automated action for the at least one user of the plurality of users of the online community, wherein the at least one automated action comprises at least one of adding a new role for the at least one user of the plurality of users of the online community or modifying a reputation level for the at least one user of the plurality of users of the online community;
    providing, by the processing device, a first user interface for a manager of the online community, the first user interface including a presentation of a list of users of the plurality of users of the online community, a reputation value for each user in the list, and one or more of the reputation statistical measures, the list of users comprising the at least one user, and being selected based on sorting of the plurality of users according to at least one of the reputation statistical measures;
    upon receiving a selection of a subset of users from the list of users in the first user interface and a selection of one of a plurality of optional actions from a management action menu, performing, by the processing device, the selected action for the selected subset of users, wherein the selected action comprises at least one of adding a new role for the selected subset of users or modifying a reputation level for the selected subset of users;
    upon receiving a selection of a user from the list of users in the first user interface by the manager, providing a second user interface for the manager, the second user interface comprising a reputation breakdown option and a graphs option;
    upon receiving a user selection of the reputation breakdown option, providing for presentation in the second user interface a reputation breakdown of a reputation value of the user by reputation category in a tabular form, the reputation breakdown including a plurality of reputation categories for the user, and a contribution of each reputation category to the reputation value of the user; and
    upon receiving a user selection of the graphs option, providing for presentation in the second user interface a graph illustrating a change in a contribution of the selected reputation category to the reputation value of the user over a period of time, wherein operations of the method are executed by a processor.

2. The method as recited in claim 1, wherein the reputation value is associated with a quality of the activities of the user in the online community, wherein the reputation value is calculated based on a plurality of contributions that are each associated with a quality of the activities of the user in a respective reputation category within the online community.

3. The method as recited in claim 2, wherein the reputation statistical measures include one or more of top reputation users, or trend for reputation value changes during a most recent set of days, or trend for reputation value changes during last seven days, or trend for reputation value changes in a most recent set of hours, or trends for reputation category contribution changes.

4. The method as recited in claim 1, wherein sorting is one or more of sorting by reputation value, or sorting by largest improvement in reputation value within a predetermined time period, or sorting by largest decrease in reputational value within the predetermined time period, or sorting by reputation category contribution, or sorting by largest increase or decrease in reputation category contribution, or sorting by amount of activities within the predetermined time period.

5. The method as recited in claim 2, wherein the reputation categories include one or more of ask a question, or report an issue, or browser, or email, or account access and safety, or reading and receiving messages, or composing and sending messages, or contacts, or operating system, or mobile operating system, or email program, or share and discuss with others, or smart phone.

6. The method as recited in claim 1, wherein the activities of the user includes one or more of messages posted, or replies to messages posted, or number of posts within a time period, or emails sent.

7. The method as recited in claim 1, further including:
evaluating one or more rules for determining alerts for the manager of the online community; and
sending alerts to the manager when the evaluating identifies alerts for the manager.

8. The method as recited in claim 1, wherein the plurality of optional actions further comprise one or more of sending email, or promoting community member status of the selected one or more users, or banning the selected one or more users, or unbanning the selected one or more users, or changing delivery settings, or changing posting permissions, or award achievement of the selected one or more users, or removing the selected one or more users from the online community.

9. The method as recited in claim 1, wherein the first user interface includes a third option to be selected to view the reputation breakdown of the reputation value of the user by reputation category in the second user interface.

10. The method as recited in claim 1, wherein the first user interface includes a fourth option for presenting graphs associated with the reputation value of the user, the graphs including one or more of a line chart for the reputation value of the user over time, or a bar chart by reputation category.

11. The method as recited in claim 1, wherein the user interface includes a fifth option for providing the activities associated with a change in the reputation value.

12. A system comprising:
a memory; and
one or more processors, coupled to the memory, to:
manage activities of a plurality of users associated with an online community;
calculate a reputation value for the plurality of users of the online community based on the activities of the users related to the online community;
periodically calculate one or more reputation statistical measures based on changes in the reputation values for the plurality of users of the online community, a reputation statistical measure identifying a trend in changes of a corresponding reputation value over a period of time;
determine, by an automated rule-based action module, at least one automated action to be performed for at least one user of the plurality of users of the online community based on the one or more reputation statistical measures and a plurality of rules;
perform the at least one automated action for the at least one user of the plurality of users of the online community, wherein the at least one automated action comprises at least one of adding a new role for the at least one user of the plurality of users of the online community or modifying a reputation level for the at least one user of the plurality of users of the online community;
provide a first user interface for a manager of the online community, the first user interface including a presentation of a list of users of the plurality of users of the online community, a reputation value for each user in the list, and one or more of the reputation statistical measures, the list of users comprising the at least one user, and being selected based on sorting of the plurality of users according to at least one of the reputation statistical measures;
upon receiving a selection of a subset of users from the list of users in the first user interface and a selection of one of a plurality of optional actions from a management action menu, perform the selected action for the selected subset of users, wherein the selected action comprises at least one of adding a new role for the selected subset of users or modifying a reputation level for the selected subset of users;
upon receiving a selection of a user from the list of users in the first user interface by the manager, provide a second user interface for the manager, the second user interface comprising a reputation breakdown option and a graphs option;
upon receiving a user selection of the reputation breakdown option, provide for presentation in the second user interface a reputation breakdown of a reputation value of the user by reputation category in a tabular form, the reputation breakdown including a plurality of reputation categories for the user, and a contribution of each reputation category to the reputation value of the user; and
upon receiving a user selection of the graphs option, providing for presentation in the second user interface a graph illustrating a change in a contribution of the selected reputation category to the reputation value of the user over a period of time.

13. The system as recited in claim 12 wherein the one or more processors are to create graphs for one or more reputation statistical measures or the reputation value.

14. The system as recited in claim 12 wherein the one or more processors are to evaluate one or more rules defining application of the automated actions, the automated actions module being operable to perform automated actions.

15. The system as recited in claim 12 wherein the one or more processors are to generate alerts relating to activity in the online community.

16. The system as recited in claim 12 further including:
a user database to store user profile information; and
a community database to store online community activities.

17. The system as recited in claim 12 further including:
a reputation database to store the reputation value for the plurality of users of the online community; and
a reputation summaries database to store the reputation statistical measures.

18. A non-transitory computer-readable medium comprising instructions, which when executed by a processing device, cause the processing to perform operations comprising:
calculating a reputation value for a plurality of users of an online community, the reputation value being based on activities of each user related to the online community;
periodically calculating one or more reputation statistical measures based on changes in the reputation values for the plurality of users of the online community, a reputation statistical measure identifying a trend in changes of a corresponding reputation value over a period of time;
determining, by an automated rule-based action module, at least one automated action to be performed for at least one user of the plurality of users of the online community based on the one or more reputation statistical measures and a plurality of rules;
performing the at least one automated action for the at least one user of the plurality of users of the online community, wherein the at least one automated action comprises at least one of adding a new role for the at least one user of the plurality of users of the online community or modifying a reputation level for the at least one user of the plurality of users of the online community;

providing a first user interface for a manager of the online community, the first user interface including a presentation of a list of users of the plurality of users of the online community, a reputation value for each user in the list, and one or more of the reputation statistical measures, the list of users comprising the at least one user, and being selected based on sorting of the plurality of users according to at least one of the reputation statistical measures;

upon receiving a selection of a subset of users from the list of users in the first user interface and a selection of one of a plurality of optional actions from a management action menu, performing the selected action for the selected subset of users, wherein the selected action comprises at least one of adding a new role for the selected subset of users or modifying a reputation level of the selected subset of users;

upon receiving a selection of a user from the list of users in the first user interface by the manager, providing a second user interface for the manager, the second user interface comprising a reputation breakdown option and a graphs option;

upon receiving a user selection of the reputation breakdown option, providing for presentation in the second user interface a reputation breakdown of a reputation value of the user by reputation category in a tabular form, the reputation breakdown including a plurality of reputation categories for the user, and a contribution of each reputation category to the reputation value of the user; and upon receiving a user selection of the graphs option, providing for presentation in the second user interface a graph illustrating a change in a contribution of the selected reputation category to the reputation value of the user over a period of time.

\* \* \* \* \*